LAST JACK HAVING EJECTION MEANS

Original Filed June 1, 1967 3 Sheets-Sheet 1

INVENTORS
Karl F. Vornberger
Walter Vornberger
Arthur J. Bothstein ATT'Y

LAST JACK HAVING EJECTION MEANS

Original Filed June 1, 1967 3 Sheets-Sheet 2

LAST JACK HAVING EJECTION MEANS

Original Filed June 1, 1967 3 Sheets-Sheet 3

United States Patent Office

Re. 26,805
Reissued Feb. 24, 1970

26,805

LAST JACK HAVING EJECTION MEANS

Karl F. Vornberger, Tewksbury, and Walter Vornberger, Medford, Mass., assignors to Jacob S. Kamborian, West Newton, Mass.

Original No. 3,398,414, dated Aug. 27, 1968, Ser. No. 642,851, June 1, 1967. Application for reissue Apr. 21, 1969, Ser. No. 830,552
Int. Cl. A43d *3/00*
U.S. Cl. 12—126 6 Claims

Matter enclosed in heavy brackets [ ] appears in the original patent but forms no part of this reissue specification; matter printed in italics indicates the additions made by reissue.

ABSTRACT OF THE DISCLOSURE

This disclosure relates to a last jack adapted to support a last in a bottom-up position so as to enable various shoe manufacturing operations to be performed on or about the last. The last jack incorporates an ejection device that is adapted to eject the last after completion of the various shoe manufacturing operations.

The illustrative embodiment of the instant invention includes a column that is mounted for vertical movement. The upper end of the column is provided with a surface adapted to support the top of a last. A last pin is mounted to the column and extends upwardly from the upper surface thereof so that when a last is placed in a bottom-up position on the upper surface of the column, the last pin may extend into the thimble of the last. The dimensions of the upper end of the column are such that a portion of the last extends horizontally beyond the column. A stationary ledge is located adjacent the top of the column and below the horizontally extending portion of the last so that as the column moves downwardly, the ledge may engage the last thus precluding downward movement of the last whereupon further downward movement of the column may cause the last pin to be retracted from the thimble thus enabling the last to fall.

The invention will now be described in greater detail with reference to the accompanying drawings wherein.

Figure 1:
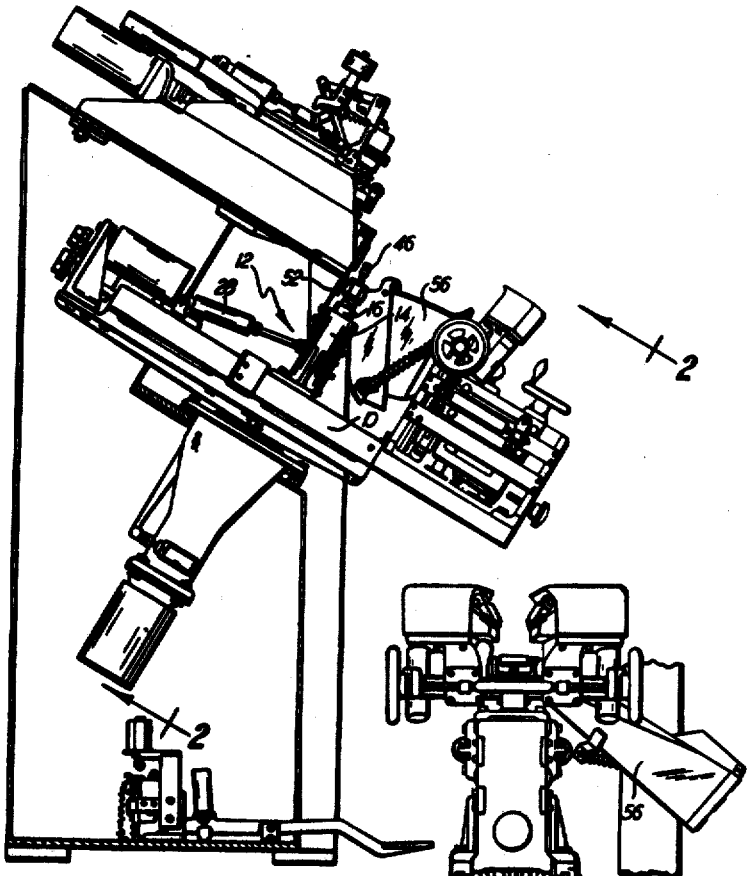
FIGURE 1 is a side elevation of the machine in which the subject of the instant invention is incorporated.
Figure 2:
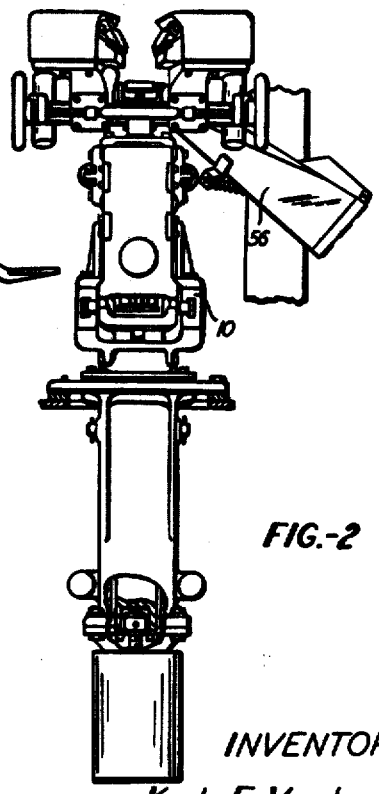
FIGURE 2 is a front view of the portion of the machine taken along the line 2—2 of FIGURE 1.
Figure 3:
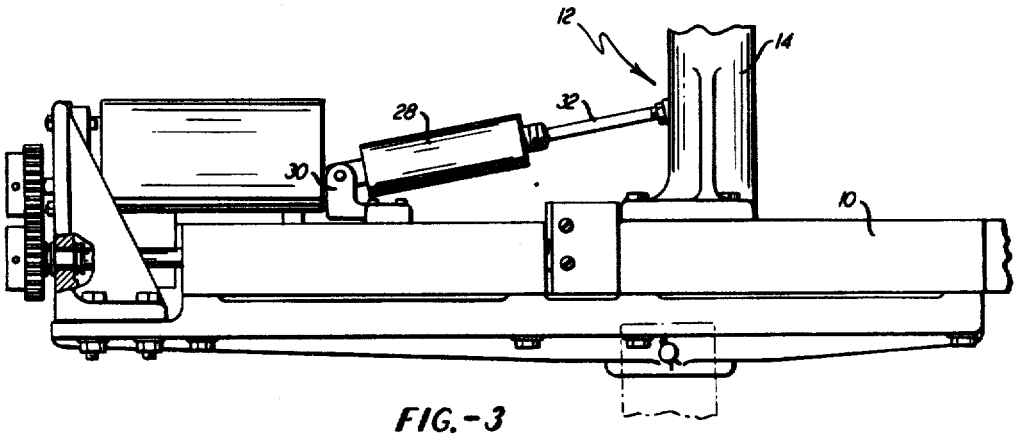
FIGURE 3 is an enlarged side view of the platform on which the last jack is supported.
Figure 4:
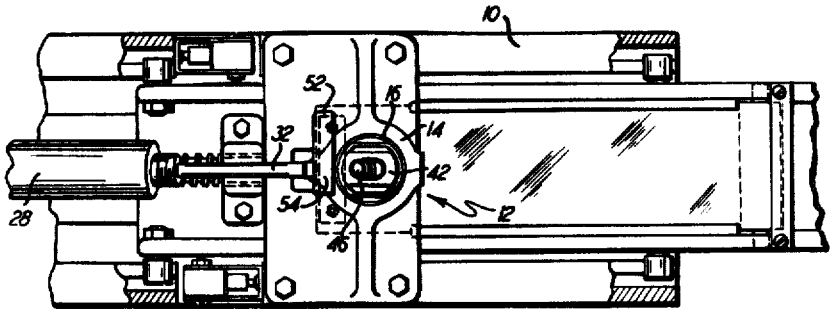
FIGURE 4 is a plan view of the last jack and last ejector.

The illustrative embodiment of the invention is herein shown as being incorporated in a shoe machine of the type shown in FIGURE 1 the function and operation of which is disclosed in [U.S. application Ser. No. 478,185, filed Aug. 9, 1965] *Patent No. 3,436,779.* Included in the machine is a platform 10. The last jack 12, which is the subject of the instant invention, is supported on the platform 10 and extends upwardly therefrom.

The last jack 12 consists of an upwardly extending *pedestal in the form of a* tubular member 14 in which a slide 16 is slidably contained for vertical movement. Vertical movement of the slide 16 is effected by means of a toggle linkage that includes an upper link 18 pivoted to the bottom of the slide 16 at the pin 20 and a pair of lower links 22, the lower links 22 being pivoted to the lower end of the upper link 18 at the pin 24 and the lower end of the links 22 being pivoted to the bottom of the tubular member 14 at the pin 26. The toggle linkage is actuable by means of an air operated motor 28 is pivotally secured to the rearward end of the platform 10 by means of a bracket 30 and has its piston rod 32 pivotally connected to the toggle linkage at the pin 24. An opening 34 is formed in the tubular member 14 to enable the piston rod 32 to protrude interiorly thereof. It may thus be seen that actuation of the motor 28 may effect vertical movement of the slide 16 and members supported thereon.

A column 36 is threaded into and extends upwardly from the slide 16 so that the elevation of the column 36 with respect to the slide 16 may be varied by rotating it within the slide 16. A detent arrangement is provided for the purpose of maintaining the column 36 in its desired, set position. The detent arrangement includes a spring biased pin 38 that is securely positioned within the column 36 and extends radially outward of and beyond the periphery of the column 36 where the end of the pin 38 is retained within a vertically extending groove 40 formed along the interior threads of the slide 16.

A last supporting plate 42, located atop the column 36 has an upper surface 44 which is adapted to support the top T of the last L when the last is in a bottom-up position. A last pin 46 is mounted to the upper end of the column 36 and extends upwardly beyond the surface 44 of the supporting plate 42. The supporting plate 42 and last pin 46 move heightwise in [unision] *unison* with the column 36 in response to actuation of the motor 28.

Figure 5:
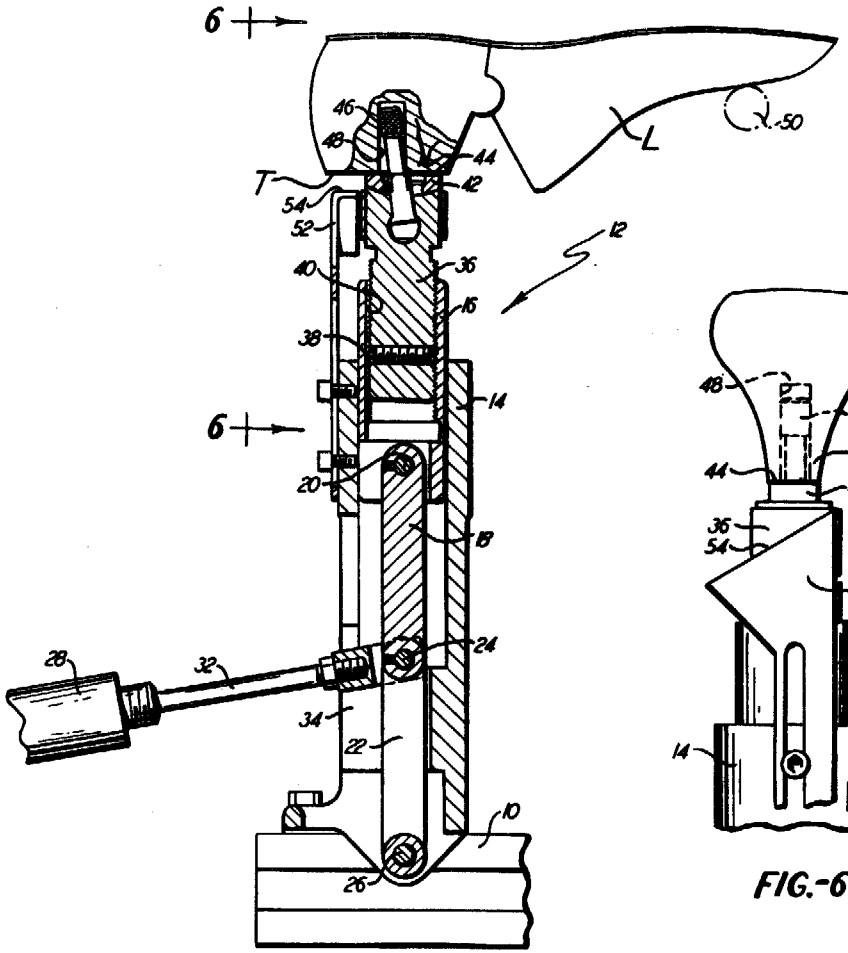
FIGURE 5 is a sectional side view of the last jack and ejector mechanism.

Referring to FIGURE 5 *a shoe assembly, comprising* the last L *and shoe components mounted thereon,* is placed on the last jack 12 in a bottom-up position with the last pin 46 entering the thimble 48 of the last L and the top T of the last L resting on the surface 44 of the last supporting plate 42. A toe supporting unit 50 may be provided to support the toe end of the last L as indicated in phantom FIGURE 5.

Figure 7:
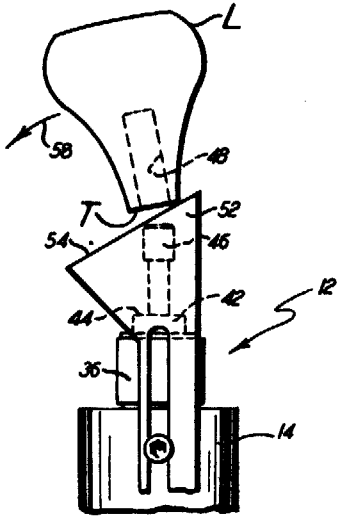
FIGURE 7 is a rearward view of the last jack just after it has been moved downwardly and illustrating engagement of the last with the stationary ledge to dislodge the last from the last jack.
Figure 6:
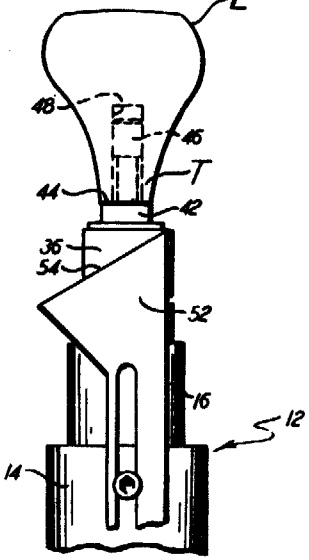
FIGURE 6 is a rear view of the last jack in its upper position, having a last supported thereon as viewed along the line 6—6 of FIGURE 5.

Included in the machine are a number of shoe operating instrumentalities among which are devices that are adapted to rigidly clamp the last L on the last jack 12 during performance of the shoe manufacturing operations. After the various shoe operating instrumentalities have effected their respective functions *on the shoe components* and have been returned to their idled positions the motor 28 is actuated to effect downward movement of the column 36 and last supported thereon. A ledge 52 secured to the rearward side of the tubular member 14 extends upwardly therefrom to a level that is just below the level of the surface 44 of the supporting plate 42 when the slide 16 is in its uppermost position. The ledge 52 is disposed in proximity to the last supporting plate 42 so that when a last is supported thereon, the ledge 52 may be just beneath a portion of the top T of the last that overhangs the last support plate 42. Thus when the motor 28 is actuated to draw the column 36 downwardly the shoe assembly may be precluded from the downward movement therewith by reason of engagement of the ledge 52 with the overhanging portion of the top T of the last thus causing the last to become dislodged from the last pin 46 and last support plate 42 whereby the last pin 46 may be retracted downwardly out of the thimble 48 of the last so as to enable the shoe assembly to fall from the column 36. The ledge 52 has a laterally extending surface 54 that is inclined downwardly so as to guide the shoe assembly in its fall in a desired direction such as, for example, towards a delivery chute or a catch bag 56 (see FIGURE 1). The direction in which the last falls is designated by the arrow 58 in FIGURE 7.

We claim:

1. A shoe machine comprising:

[a frame having] at least one shoe operating instrumentality [supported thereon];

a shoe assembly support [supported on said frame and being] adapted to support [said] *a* shoe assembly in a first position such that said shoe operating [instrumentalities] *instrumentality* may perform [their] *its* [respective functions] *function* on said shoe assembly, said shoe assembly support being so constructed as to enable a portion of said shoe assembly to [extend beyond an edge of] *overhang* said support [in a substantially horizontal direction];

means mounting said shoe assembly support [on said frame] for downward movement *from said first position* to a second position; and a [retaining] ledge [supported on said frame and being] disposed adjacent [said edge of] *to* but below the upper end of said shoe assembly support when said support is in said first position so as to be disposed [below] *beneath* said [horizontally extending] *overhanging* portion of said shoe assembly, whereby upon movement of said shoe assembly [supporting means] *support* to said second position said shoe assembly may be engaged by said ledge to thereby preclude downward movement of said shoe assembly with said support so as to dislodge said shoe assembly from said support and enable said shoe assembly to fall therefrom.

2. [An apparatus] *A machine* as recited in claim 1 wherein [the upper end of said ledge is disposed adjacent the upper end of said shoe assembly support when in said first position thereof and wherein the lower portion of] said ledge is inclined downwardly in a predetermined direction whereby [upon engagement of said shoe assembly with said ledge to enable said shoe assemly to fall from said support,] said shoe assembly may fall along said predetermined direction.

3. A shoe machine comprising:

[a frame;]

a last support [supported on said frame, said last support] having an upper end adapted to support the top of [said] *a* last and a last in extending upwardly from said upper end of said last support for engagement with the thimble of said last, said last support being normally disposed in a first, [uppermost] *upper* position, said last support being of such dimensions as to enable a portion of said last to [extend beyond an edge of] *overhang* said support [in a substantially horizontal direction];

a [retaining] ledge [supported on said frame and being] disposed adjacent [said edge of] *to* but below [said] *the* upper end of said last support [as] *when the last supports is* in said first [, uppermost] position so as to be disposed [below] *beneath* said [horizontally extending] *overhanging* portion of said last; and means mounting said last support for movement in a downward direction *from said first position* to a second, lower position wherein the top of said last pin is disposed below the level of said [retaining] ledge whereby upon movement of said last support to said second position said last may engage said ledge thereby substantially precluding downward movement of said last to enable said last pin to become retracted from the thimble of said last [whereby] *so that* said last may become dislodged from said support and fall therefrom.

4. [An apparatus] *A machine* as recited in claim 3 wherein [the upper end of said ledge is disposed adjacent the upper end of said last support when in said first position thereof and wherein the lower portion of] said ledge is inclined downwardly in a predetermined direction whereby [upon engagement of said last with said ledge to enable said shoe assembly to fall from said support,] said [shoe assmebly] *last* may fall along said predetermined direction.

5. An apparatus supporting a last comprising:

a pedestal;

a slide [,] slidably mounted on said pedestal for heightwise movement;

a last support mounted to and extending upwardly of said slide, the upper end of said last support being adapted to support said last, *said last support being normally disposed in a first, upper position,* said last support being so constructed as to enable a portion of said last to [extend beyond an edge of] *overhang* said last support [in a substantially horizontal direction];

a [retaining] ledge mounted to said pedestal and being disposed [adjacent] *beneath* said [edge of but below said upper end of said last support so as to be located below said horizontally extending portion] *overhanging portion* of said last *when the last support is in said first position; and* drive means operatively connected to said slide for effecting downward movement thereof *from said first poisition* to a level wherein the upper end of said last support is [disposed] below the level of [said retaining] *the* ledge whereby upon downward movement of said slide said last may engage said ledge thereby precluding downward movement of said last to cause said last to become dislodged from said last support and fall therefrom.

6. An apparatus as recited in claim 5 wherein [the upper end of said ledge is disposed adjacent the upper end of said last support and wherein the lower portion of] said ledge is inclined downwardly in a predetermined direction whereby [upon engagement of said shoe assembly with said ledge to enable said shoe assembly to fall from said support,] said [shoe assembly] *last* may fall along said predetermined direction.

References Cited

The following references, cited by the Examiner, are of record in the patented file of this patent or the original patent.

UNITED STATES PATENTS

| | | | |
|---|---|---|---|
| 2,724,844 | 11/1955 | Seabury et al. | 12—126 X |
| 2,896,233 | 7/1959 | Markham et al. | 12—126 X |
| 2,908,921 | 10/1959 | Kant | 12—1 |

PATRICK D. LAWSON, Primary Examiner

PO-1050
(5/69)

UNITED STATES PATENT OFFICE
CERTIFICATE OF CORRECTION

Patent No. Re. 26,805 Dated Feb. 24, 1970

Inventor(s) Karl F. Vornberger et al

It is certified that error appears in the above-identified patent and that said Letters Patent are hereby corrected as shown below:

Column 3: line 47, change "in" to --pin--; line 59, change "supports" to --support--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents